July 21, 1959
R. McCLURE
2,895,345
SAFETY STEERING WHEEL
Filed Nov. 13, 1956
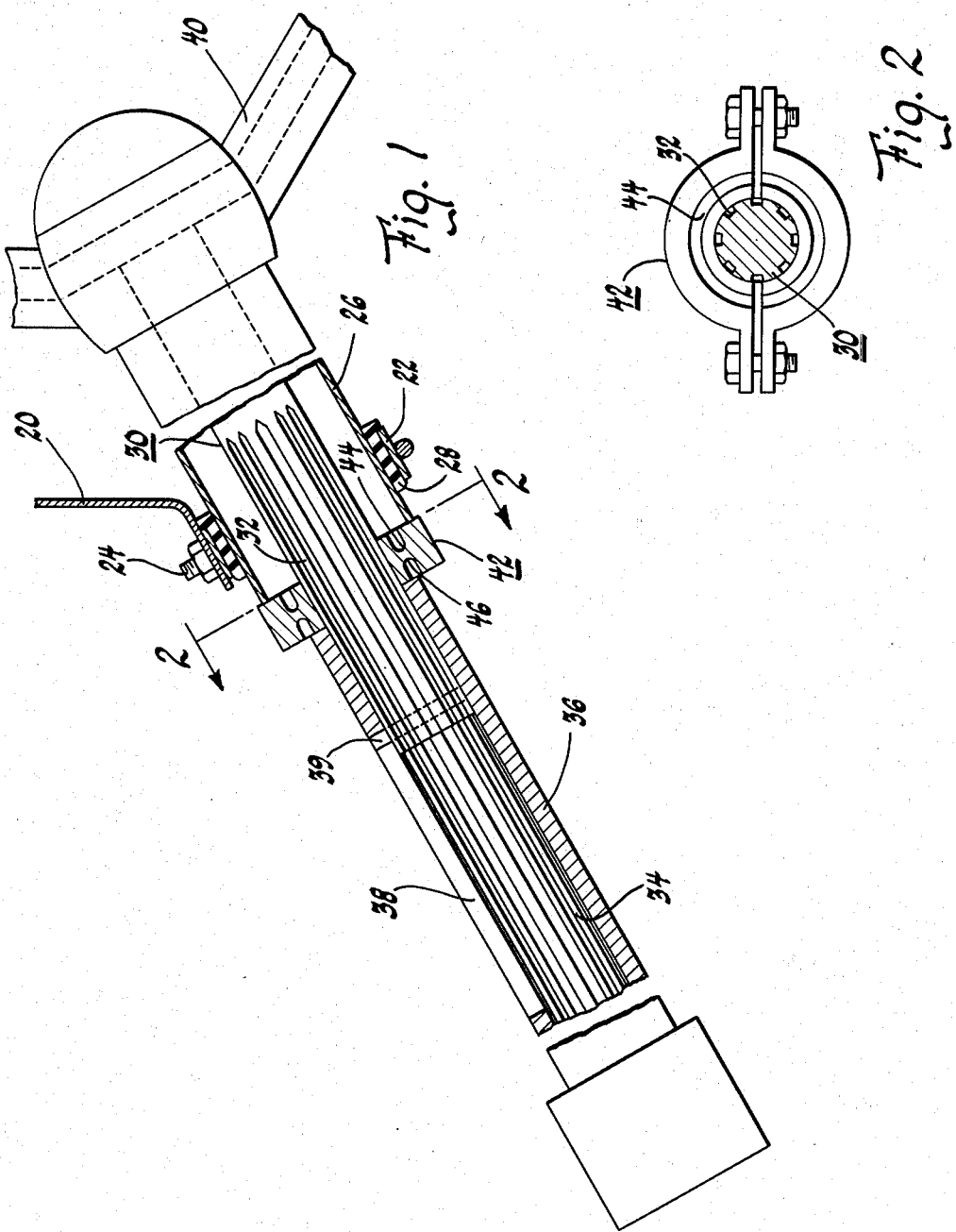
INVENTOR.
Robert McClure
BY
HIS ATTORNEY

United States Patent Office 2,895,345
Patented July 21, 1959

2,895,345

SAFETY STEERING WHEEL

Robert McClure, Detroit, Mich., assignor to General Motors Corporation, Detroit, Mich., a corporation of Delaware Application November 13, 1956, Serial No. 621,768

2 Claims. (Cl. 74—493)

This invention relates to steering wheels and is particularly concerned with safety steering wheels for use in automotive vehicles and the like.

The trend in the manufacture of automotive vehicles is toward improved safety devices which make the use of the vehicle less hazardous and which will protect the occupants to a major degree when an accident occurs. One of the danger points is the steering wheel. This device protrudes into the driving compartment and, in case of an accident, the inertia of the driver's body will throw him against the steering wheel, in many cases causing severe injury if the deceleration of the vehicle is sufficiently great.

Many devices have been proposed to cushion the shock in such instances and one of these is shown in Patent No. 2,166,290, wherein the steering column per se is formed from resilient material so that the wheel will move out of the driver's path and will simultaneously absorb some of the impact shock. Other devices have been provided with the same view in mind including cushioning means on the steering wheel, on the horn blowing ring and/or the horn button. Some of these improvements are disclosed in copending applications, Serial Nos. 597,452, filed July 12, 1956, and 605,800, filed August 23, 1956, both assigned to the assignee of the present invention.

More specifically, this invention is directed to a safety steering wheel which will not only absorb a portion of the impact shock but will also, upon predetermined load applied thereto, move out of the way of the driver to eliminate the possibility of the steering column piercing the driver's body or otherwise seriously injurying the driver.

In order to accomplish this end, it is, therefore, one of the objects of this invention to provide a safety steering wheel assembly which is held in operative position by a holding means consisting of a breakable part which will shatter or shear upon a predetermined impact load being applied thereto, and will thereafter permit the steering wheel and steering column to move away from the driver's body or, stated differently, move in the same direction as the driver's body is moving.

It is a further object of the invention to provide a breakable bracket made from an alloy which will shatter under predetermined impact loads applied thereto or to provide a shear pin made from a material which will shear upon predetermined impact loads, either of said devices being incorporated in the steering column structure to permit movement of the wheel and steering column from the normal position after an accident has occurred which has caused the shattering or shearing of the part.

Further objects and advantages of the present invention will be apparent from the following description, reference being had to the accompanying drawings wherein preferred embodiments of the present invention are clearly shown.

In the drawings:

Figure 1 is a cross-sectional view of one embodiment of the invention wherein a bracket collar capable of being shattered is interposed in a steering column.

Figure 2 is a section taken on line 2—2 of Figure 1.

Referring to the drawings, Figure 1 shows one embodiment of the invention wherein 20 is a portion of the dashboard of an automotive vehicle and 22 is a bracket bolted thereto by means of a bolt and nut 24. The bracket supports a steering mast jacket 26 through a rubber bushing 28. Passing through the mast jacket 26 is a steering column 30 externally splined longitudinally thereof at 32. The splines fit within internal splines 34 carried by a tubular steering column 36. Column 36 is slotted at 38 and a pin carried by the steering column 30 and extending into the slot will limit the longitudinal telescopic movement between the steering column 30 and the tubular portion thereof 36. At the upper end of the column 30 is a steering wheel 40 of suitable design.

Interposed between the mast jacket 26 and the tubular portion of the steering column 36 is an annular bracket collar member 42 suitably grooved at opposite sides thereof as at 44 and 46. The grooves 44 and 46 are aligned on opposite sides of the member 42 and have a mean diameter substantially equal to the outer diameter of the tubular portion 36. When the annular collar member 42 is in place, the mast jacket 26 rests on one side thereof while the tubular member 36 is on the other side thereof and the pin 39 is at the uppermost limit of the slot 38. This is the driving position, or operative position, of the steering assembly. The annular member 42 is preferably formed from a magnesium-aluminum alloy of brittle nature or, for that matter, any other suitable material since the shear strength thereof is predetermined by the depth of the grooves 44 and 46.

In the event of an accident, when the driver's body is thrown against the wheel 40, the impact shock thereof is transmitted to the mast jacket 26 and causes a shearing or breakage of the annular member 42 at the weakened portion thereof between the grooves 44 and 46. This permits the mast jacket to move downwardly longitudinally of the steering column and permits the steering column 30 to slide longitudinally within the tubular portion thereof 36 downwardly to the limit of movement as determined by the length of the slot 38. This causes the entire steering wheel to move away from the driver.

From the foregoing, it is manifest that the invention consists broadly of providing means associated with the steering column for permitting movement of the steering column away from the driver's body in the event of an accident at the time the driver's body is thrown against the wheel and when sufficient force is applied to cause breakage of a given part. This breakage factor is important since I am aware of past structures which merely cushion the shock but, it is pointed out that, when an accident occurs of sufficient magnitude to cause the driver's body to be thrown against the wheel, it is highly desirable to have a part break in the assembly which must be replaced before the car can again be driven normally. This assures that the steering equipment will be inspected after the accident and any misalignment or malfunctioning condition will be corrected prior to the time that the car is again driven in normal operation. Where shock absorbing means alone are provided in the steering assembly, the steering assembly does not, in many cases, receive thorough inspection with the result that faulty steering equipment is used which, in itself, frequently causes another accident.

Thus, in the present instance, if the accident is sufficiently severe to cause a breakage of the shear part provided in the assembly, the entire steering mechanism must be gone over by an expert in order to replace the part and render the assembly operative again.

While the invention has been illustrated through the use of a collar member and a shear pin, it is manifest that other breakable parts can be used in a number of modifications to provide the same operating characteristics and any of such parts are fully within the scope of my invention either with or without shock absorbing means being provided between the telescoping portions of the steering column.

While the embodiments of the present invention as herein disclosed constitute preferred forms, it is to be understood that other forms might be adopted.

What is claimed is as follows:

1. A safety steering wheel assembly adapted to move toward a dashboard of a vehicle under predetermined load, comprising, in combination, a telescopic steering column including a tubular portion having internal splines, a member attached to a steering wheel and having external splines complementary to said internal splines of said tubular portion, an annular steering mast jacket being supported resiliently relative to the dashboard as well as being carried by the steering wheel and spaced radially outwardly from said externally splined member at a diameter exceeding an outer diameter of said tubular portion, and an annular bracket collar means interposed between said mast jacket and said steering column tubular portion, said collar means being formed of a metallic alloy including a radially inner portion abutting against an end of said steering column tubular portion as well as a radially outer portion abutting against an end of said mast jacket and an intermediate portion joining said radially inner and outer portions at a location between grooves on opposite sides of said collar means and aligned to have a mean diameter substantially equal to the other diameter of said steering column tubular portion whereby said collar means prevents longitudinal movement of said externally splined member relative to said steering column tubular portion unless said mast jacket transmits a predetermined impact load to said radially outer portion of said collar means and thereby effects shearing of said collar means adjacent to said intermediate portion thereof substantially in alignment with said grooves and the outer diameter of said steering column tubular means.

2. The assembly of claim 1 wherein said steering column tubular means has a longitudinally extending slot, and a pin is provided adjacent to an end of said externally splined member and is adapted to have a radially protruding portion slidable in the slot to limit telescopic movement as determined by length of the slot.

References Cited in the file of this patent

UNITED STATES PATENTS

| | | |
|---|---|---|
| 1,207,227 | Seybold | Dec. 5, 1916 |
| 1,646,427 | Skidmore, Jr. | Oct. 25, 1927 |
| 1,791,001 | Rasmussen | Feb. 3, 1931 |
| 2,070,329 | Brecht | Feb. 9, 1937 |
| 2,273,772 | Pollitz | Feb. 17, 1942 |
| 2,356,322 | Johnson | Aug. 22, 1944 |
| 2,361,226 | Miner, Jr., et al. | Oct. 24, 1944 |
| 2,566,690 | Wright | Sept. 4, 1951 |
| 2,665,128 | Guffey | Jan. 5, 1954 |

FOREIGN PATENTS

| | | |
|---|---|---|
| 458,542 | Italy | July 20, 1950 |